US012760140B2

(12) United States Patent
Sprenger et al.

(10) Patent No.: US 12,760,140 B2
(45) Date of Patent: Oct. 13, 2026

(54) MATRIX RESIN FOR PRODUCTION OF FIBRE COMPOSITE MATERIALS

(71) Applicant: Evonik Operations GmbH, Essen (DE)

(72) Inventors: Stephan Sprenger, Oststeinbek (DE); Jaclyn Balthasar, Basedow (DE)

(73) Assignee: Evonik Operations GmbH, Essen (DE)

(*) Notice: Subject to any disclaimer, the term of this patent is extended or adjusted under 35 U.S.C. 154(b) by 674 days.

(21) Appl. No.: 18/257,435

(22) PCT Filed: Dec. 13, 2021

(86) PCT No.: PCT/EP2021/085400
§ 371 (c)(1),
(2) Date: Jun. 14, 2023

(87) PCT Pub. No.: WO2022/128867
PCT Pub. Date: Jun. 23, 2022

(65) Prior Publication Data

US 2024/0026059 A1 Jan. 25, 2024

(30) Foreign Application Priority Data

Dec. 17, 2020 (EP) .................................... 20214856

(51) Int. Cl.
*C08G 14/06* (2006.01)
*C08G 14/10* (2006.01)
(Continued)

(52) U.S. Cl.
CPC .............. *C08G 14/06* (2013.01); *C08J 3/243* (2013.01); *C08J 3/247* (2013.01); *C08J 3/28* (2013.01)

(58) Field of Classification Search
None
See application file for complete search history.

(56) References Cited

U.S. PATENT DOCUMENTS 4,990,591 A 2/1991 Schilling
9,102,778 B2 8/2015 Sprenger
(Continued)

FOREIGN PATENT DOCUMENTS

CN 1869086 A 11/2006
CN 107778425 A 3/2018
(Continued)

OTHER PUBLICATIONS

Gao et al., "Fabrication of lignin based renewable dynamic networks and its applications as self-healing, antifungal and conductive adhesives," Chemical Engineering Journal, vol. 394, 124896, pp. 1-10, (2020). (Year: 2020).*
(Continued)

*Primary Examiner* — Ha S Nguyen
(74) *Attorney, Agent, or Firm* — Grüneberg Global IP, PLLC

(57) ABSTRACT

A composition contains at least one aldehyde (A), at least one phenolic compound (B), and at least one amine (C) bearing at least two amino groups selected from primary and secondary amino groups. At least one of these compounds bears at least one (meth)acrylate group. A fibre-reinforced composition contains the composition. The compositions can be cured in a process, and fibre composite materials/thermosets are obtainable by the process.

20 Claims, 2 Drawing Sheets

(1) (2) (3) (4)

(51) Int. Cl.

| | |
|---|---|
| ***C08J 3/24*** | (2006.01) |
| ***C08J 3/28*** | (2006.01) |
| ***C08L 61/34*** | (2006.01) |
| ***C09D 161/34*** | (2006.01) |

(56) References Cited

U.S. PATENT DOCUMENTS

| | | | |
|---|---|---|---|
| 9,175,145 | B2 | 11/2015 | Eger et al. |
| 10,214,612 | B2 | 2/2019 | Langkabel et al. |
| 10,221,277 | B2 | 3/2019 | Langkabel et al. |
| 10,280,252 | B2 | 5/2019 | Ortelt et al. |
| 10,422,074 | B2 | 9/2019 | Sprenger et al. |
| 10,479,726 | B2 | 11/2019 | Sprenger et al. |
| 2007/0191556 | A1 | 8/2007 | Eger |
| 2009/0298987 | A1 | 12/2009 | Eger et al. |
| 2011/0060105 | A1 | 3/2011 | Sprenger |
| 2015/0133597 | A1 | 5/2015 | Eger et al. |
| 2017/0355808 | A1 | 12/2017 | Langkabel et al. |
| 2017/0355809 | A1 | 12/2017 | Langkabel et al. |
| 2017/0355810 | A1 | 12/2017 | Langkabel et al. |
| 2018/0030648 | A1 | 2/2018 | Sprenger et al. |
| 2018/0044233 | A1 | 2/2018 | Sprenger et al. |
| 2018/0162991 | A1 | 6/2018 | Ortelt et al. |
| 2018/0201703 | A1 | 7/2018 | Kessler et al. |
| 2019/0270907 | A1 | 9/2019 | Nakao |

FOREIGN PATENT DOCUMENTS

| | | |
|---|---|---|
| CN | 109476801 A | 3/2019 |
| EP | 3 255 078 | 12/2017 |
| EP | 3 581 601 | 12/2019 |
| WO | 2017/007883 | 1/2017 |
| WO | 2022/053357 | 3/2022 |

OTHER PUBLICATIONS

U.S. Appl. No. 11/662,618, filed Aug. 17, 2009, Eger et al.

U.S. Appl. No. 14/601,549, filed Jan. 21, 2015, Eger et al.

U.S. Appl. No. 15/603,966, filed May 24, 2017, Langkabel et al.

Bassett et al., "Vanillin-Based Resin for Additive Manufacturing", ACS Sustainable Chemistry Engineering, vol. 8, 2020, pp. 5626-5635.

Cardellicchio et al., "The Betti base: the awakening of a sleeping beauty", Tetrahedron: Asymmetry, vol. 21, 2010, pp. 507-517.

Extended European Search report received for European Patent Application No. 20214856.5, mailed on May 27, 2021, 7 pages.

Holmberg et al., "Softwood Lignin-Based Methacrylate Polymers with Tunable Thermal and Viscoelastic Properties", American Chemical Society, Macromolecules, vol. 49, 2016, pp. 1286-1295.

International Search Report issued Jan. 12, 2022, in PCT/EP2021/085400, with English Translation, 7 pages.

Stanzione III et al., "Vanillin-based resin for use in composite applications", Green Chem. vol. 14, 2012, pp. 2346-2352.

Written Opinion issued Jan. 12, 2022, in PCT/EP2021/085400, with English Translation, 11 pages.

Zhang et al., "Biorenewable polymers based on acrylated epoxidized soybean oil and methacrylated vanillin", Materials Today Communications, vol. 5, 2015, pp. 18-22.

Hamada, et al., "Multicomponent-Reaction-Ready Biomass-Sourced Organic Hybrids Fabricated via the Surface Immobilization of Polymers with Lignin-Based Compounds", ACS Sustainable Chemistry Engineering, vol. 7, 2019, 9 pages.

Office Action issued in Chinese Patent Application No. 202180084563.1 on Dec. 22, 2025, with English translation, 8 pages.

* cited by examiner (1) (2) (3) (4)

MATRIX RESIN FOR PRODUCTION OF FIBRE COMPOSITE MATERIALS

CROSS-REFERENCE TO RELATED APPLICATIONS

This application is the National Stage entry under § 371 of International Application No. PCT/EP2021/085400, filed on Dec. 13, 2021, and which claims the benefit of priority to European Application No. 20214856.5, filed on Dec. 17, 2020. The content of each of these applications is hereby incorporated by reference in its entirety.

BACKGROUND OF THE INVENTION

Field of the Invention

The present Invention relates to matrix resins for the production of fibre composite materials.

Description of Related Art

Glass or carbon fibre-reinforced fibre composite materials for higher-quality applications are mainly produced on the basis of thermosetting resin systems. Unsaturated polyester resins have the quantitatively largest market share, followed by epoxy resins and vinyl ester resins. Fibre composite materials based on epoxy resins generally exhibit the best mechanical properties and components based on unsaturated polyester resins the poorest. However, unsaturated polyester resins are cheaper than epoxy resins and easier to use since they are crosslinked with peroxides. Vinyl ester resins represent a compromise in terms of performance, ease of use and cost.

These thermosetting resin systems are all based on oil-based raw materials; polyester resins and vinyl ester resins also contain larger amounts of styrene, a substance which is not unconcerning in terms of occupational hygiene.

Biobased matrix resins that are easy to use, have good mechanical properties and are acceptable in terms of cost have therefore long been sought. However, the hitherto available resin systems have not met these requirements—cf. for example polyfurfuryl alcohol. Polyfurfuryl alcohol undergoes crosslinking with elimination of water and very quickly becomes highly viscous. A low-viscosity polyfurfuryl alcohol resin employable using infusion generally contains a great deal of water. Curing of this resin forms bubbles. In addition such thermosets/fibre composite materials are highly porous.

Biobased reactive materials have long been known both in the field of epoxide chemistry (for example epoxidized soybean oils or epoxidized cashew nut shell oil) and in the field of polyester chemistry (for example cardanol, obtained from cashew nut shell oil, colophony resins or unsaturated oleic acids). These are often only employed as formulation constituents since in pure form they result in polymers having poor mechanical properties.

Vanillin is nowadays very cost-effectively produced on a large industrial scale from lignin, a waste product of the paper industry. In 2014 this already amounted to more than 17 000 tons. It is well known that vanillin is employed as an aroma chemical in the foodstuffs industry and is thus not toxic. Methacrylated vanillin (vanillin methacrylate) is also known. Both its production and its use in composites or in 3D printing are described for example in Stanzione III et al., "Vanillin-based resin for use In composite applications" Green Chem., 2012, 14, 2346-2352 or Bassett et al. "Vanillin-Based Resin for Additive Manufacturing", *ACS Sustainable Chem. Eng.* 2020, 8, 5626-5635.

However, in the field of fibre composite materials the use of methacrylated vanillin encounters two problems. Firstly, methacrylated vanillin cannot simply be used in typical fibre composite operations since it is a solid. While methacrylated vanillin dissolves in such acrylate monomers as are often used as reactive diluents, for example 1,6-hexanediol diacrylate (HDDA), mixing this solution with the hardener and accelerator necessary for use causes the methacrylated vanillin to crystallize out again and renders further use impossible. Furthermore, cured methacrylated vanillin is very brittle and therefore unsuitable as a matrix resin for fibre composite materials.

The prior art also discloses mixtures of methacrylated vanillin with acrylated, epoxidized soybean oil, such as for example from Zhang, C. et al. "Biorenewable Polymers based on acrylated epoxidized soybean oil and methacrylated vanillin", Materials Today Communications 5 (2015) 18-22. However, the mechanical properties of the cured mixtures are not sufficient for production of fibre composite components.

Experiments performed by the inventors have shown that mixtures of methacrylated vanillin and cardanol, which, as mentioned, is often employed in the field or polyester chemistry, are not storage stable. The methacrylated vanillin likewise crystalizes out.

Experiments performed by the Inventors have further shown that mixtures of methacrylated vanillin, cardanol and acrylate monomers, for example HDDA, as reactive diluents did appear to exhibit better storage stability but mixing with hardener and accelerator again likewise resulted in spontaneous crystallization, thus rendering use Impossible.

SUMMARY OF THE INVENTION

The problem addressed by the present invention was therefore that of overcoming at least one of the abovementioned disadvantages.

It has now been found that, surprisingly, this problem is solved by a composition comprising

- at least one aldehyde (A),
- at least one phenolic compound (B) and
- at least one amine (C) bearing at least two amino groups selected from the group consisting of primary and secondary amino groups,
- wherein at least one of these compounds bears at least one (meth)acrylate group.

This composition is preferably a resin, also known as a resin system, which is curable to afford a thermoset (a so-called thermosetting resin system), wherein this resin exhibits a very advantageous profile of properties for the production of composite materials, in particular fibre composite materials. The resin is storage stable, has a low viscosity and may be readily mixed and further used with customary hardeners and accelerators. After addition of hardeners and accelerators the resin has a sufficiently long pot life (usage time) of about 4 hours which is exceptionally Important in practice. The resin may be pre-cured at moderate temperatures of 40° C. to 100° C., for example 80° C. After a post-curing at a temperature of >100° C. to 200° C., for example 140° C., the resin exhibits very good mechanical properties and is not brittle. It is therefore exceptionally suitable for the production of thermosets and fibre composite materials.

The invention thus firstly provides a composition comprising at least one aldehyde (A), at least one phenolic compound (B) and at least one amine (C) bearing at least two amino groups selected from the group consisting of primary and secondary amino groups, wherein at least one of these compounds bears at least one (meth)acrylate group.

The invention further provides a fibre-reinforced composition comprising at least one fibre material, preferably composed of one or more renewable raw materials, and the composition according to the invention.

The invention yet further provides a process for curing the composition according to the invention or the fibre-reinforced composition according to the invention, characterized in that the curing is effected via a radical and a non-radical curing mechanism and preferably comprises the steps of:

(i) a thermal pre-curing at a temperature of 40° C. to 100° C., in particular over a period of 1 h to 8 h, and/or a photochemical pre-curing via actinic radiation, in particular UV light;

(ii) a thermal post-curing at a temperature of >100° C. to 200° C., in particular over a period of 1 h to 8 h.

The invention yet further provides a fibre composite material/thermoset obtainable by the process according to the invention.

Advantageous configurations of the invention are specified in the examples and the description. It is moreover explicitly noted that the disclosure of the subject matter of the present invention encompasses all combinations of individual features in the present or subsequent description of the invention. More particularly, embodiments of one subject of the invention are also applicable mutatis mutandis to the embodiments of the other subjects of the invention.

The subject matter of the invention and preferred embodiments thereof are hereinbelow described by way or example without any intention that the invention be confined to these illustrative embodiments. Where ranges, general formulae or compound classes are specified below, these are intended to include not only the corresponding ranges or groups of compounds which are explicitly mentioned but also all subranges and subgroups of compounds which can be obtained by removing individual values (ranges) or compounds. Where documents are cited in the context of the present description, the entire content thereof is intended to be part of the disclosure content of the present Invention.

DETAILED DESCRIPTION OF THE INVENTION

Figure 1:
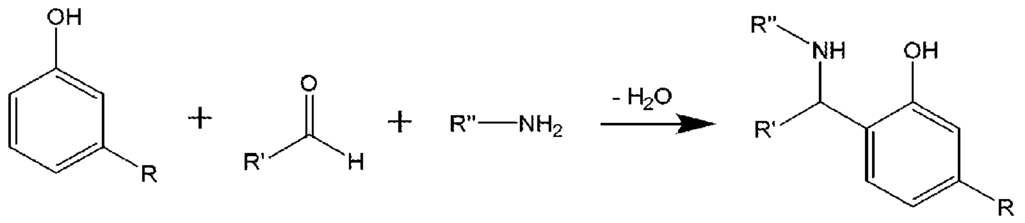
FIG. 1 is a schematic diagram of a condensation reaction (Betti reaction/Mannich reaction) of a phenolic compound (1), an aldehyde (2) and an amine (3) to form a Betti base/Mannich base (4) and to liberate water.

Where measured values, parameters or substance properties determined by measurement are reported hereinbelow, these are unless otherwise stated measured values, parameters or substance properties measured at 25° C. and preferably at standard pressure. Standard pressure is to be understood as meaning a pressure of 101 325 Pa.

The expression "(meth)acrylic" stands for "methacrylic" and/or "acrylic". Accordingly, the term "(meth)acrylate group" stands for a methacrylate group and/or an acrylate group. A methacrylate group is to be understood as meaning a methacrylic acid ester group and an acrylate group is to be understood as meaning an acrylic acid ester group.

As already elucidated hereinabove the composition according to the invention comprises at least one aldehyde (A), at least one phenolic compound (B) and at least one amine (C) bearing at least two amino groups selected from the group consisting of primary and secondary amino groups, wherein at least one or these compounds bears at least one (meth)acrylate group.

The (meth)acrylate group is necessary for the free-radical curing mechanism. The aldehyde (A), the phenolic compound (B) and the amine (C) are also necessary for the non-radical curing mechanism which, without wishing to be bound to a particular theory, proceeds via a Betti reaction/Mannich reaction.

It is preferable when at least one of the compounds (A). (C) and (B) is produced from renewable raw materials or is a renewable raw material. It is especially preferable when at least one aldehyde (A) and one phenolic compound (B) are produced from renewable raw materials and/or are renewable raw materials. Depending on the composition of the mixture it is possible to achieve for example a mass fraction of biobased raw materials between 75-96% based on the total mass of the composition.

It is preferable when at least one or all aldehydes (A) bear at least one (meth)acrylate group. It is also preferable when at least one or all aldehydes (A) are aromatic. It is therefore likewise preferable when at least one or all aldehydes (A) are aromatic and bear at least one (meth)acrylate group. It is further preferable when at least one aldehyde (A) is (meth) acrylated vanillin (vanillin (meth)acrylate). It is especially preferable when exclusively (meth)acrylated vanillin (vanillin (meth)acrylate) is used as aldehyde (A). In the context of the present invention the terms "(meth)acrylated vanillin" and "vanillin (meth)acrylate" are used synonymously. "(Meth)acrylated vanillin" or "vanillin (meth)acrylate" is 4-(meth)acryloxy-3-methoxybenzaldehyde, the (meth) acrylic acid ester of 4-hydroxy-3-methoxybenzaldehyde (vanillin). Methacrylated vanillin (vanillin methacrylate, 4-methacryloxy-3-methoxybenzaldehyde) has a structure according to formula (I):

Formula (I)

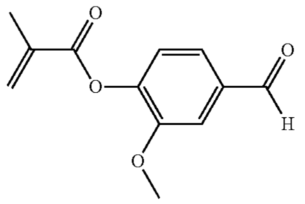

Acrylated vanillin (vanillin acrylate, 4-acryloxy-3-methoxybenzaldehyde) accordingly has a structure as shown in formula (II):

Formula (II)

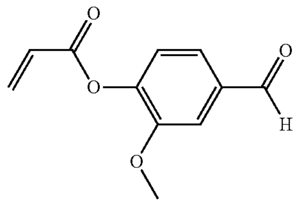

It Is especially preferable when the at least one aldehyde (A) Is or comprises methacrylated vanillin (vanillin methacrylate, 4-methacryloxy-3-methoxybenzaldehyde). This compound is obtainable for example under the name Visiomer® VALMA from Evonik.

The composition according to the invention further contains at least one phenolic compound (B). A phenolic compound is to be understood as meaning a compound which bears one or more hydroxy groups on one or more aromatic systems, which are also referred to as aromatic ring systems. These hydroxy groups are thus bonded in each case to one carbon atom which in turn is part of an aromatic system. The simplest example of a phenolic compound is phenol (hydroxybenzene).

It is preferable when at least one or all phenolic compounds (B) are ethylenically unsaturated compounds. An ethylenically unsaturated compound is to be understood as meaning a compound which contains at least one C═C double bond which is not part of an aromatic system. It is thus preferable when the phenolic compound (B) contains at least one C═C double bond which is not part of an aromatic system. Without wishing to be bound to a particular theory it is thought that the C═C double bonds are at least partially involved in the radical curing mechanism.

It Is particularly preferable when at least one or all phenolic compounds (B) are cardanols. Cardanols are phenolic compounds obtained by decarboxylation of anacardic acids. Anacardic acids are in turn the main constituent of cashew nut shell liquid/cashew nut shell oil which is in turn a byproduct of cashew nut processing. In the context of the present invention anacardic acids are to be understood as meaning compounds of formula (III) and cardanols as meaning compounds of formula (IV), Formula (III)

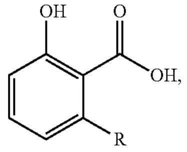

Formula (IV)

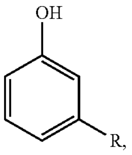

wherein R is Independently at each occurrence a saturated or unsaturated hydrocarbon radical.

The anacardic acids of the cashew nut shell oil and accordingly the cardanols obtainable therefrom generally comprise a hydrocarbon radical R having 15 carbon atoms, wherein the degree of saturation may vary. The cardanol obtained from the cashew nut shell oil contains about 41% triunsaturated cardanol, about 34% monounsaturated cardanol, about 22% diunsaturated cardanol and about 2% saturated cardanol in each case reported in percent by mass based on the total mass of the cardanols.

It is therefore preferable when the radical R in formula (III)/(IV) is a hydrocarbon radical having carbon atoms. It is further preferable when the radical R in formula (III)/(IV) has no, one, two or three C═C double bonds.

It Is thus especially preferable when the radical R in formulae (III) and (IV) is independently at each occurrence a radical having 15 carbon atoms and has no, one, two or three C═C double bonds.

Since the C═C double bonds are radically polymerizable, it is further preferable when the radical R is independently at each occurrence a radical having at least one C═C double bond.

It is thus preferable when the radical R is independently at each occurrence a radical having at least one C═C double bond and/or having 15 carbon atoms, in particular a radical having at least one C═C double bond and having 15 carbon atoms.

Anacardic acid, which lends its name to the group of the anacardic acids and is the main constituent of the anacardic acids in cashew nut shell oil, comprises for example a radical R of formula (V).

Formula (V)

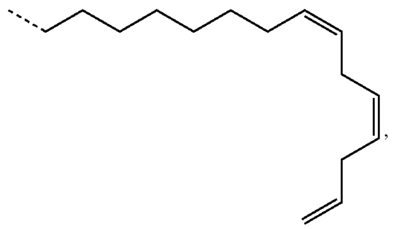

wherein the dashed line represents the covalent bond to the benzene ring. It is therefore preferable when R in formulae (III) and (IV) is a radical of formula (V). Likewise preferable are radicals R derived from a radical of formula (V) (formal) by hydrogenation/saturation of one, two or all three C═C double bonds.

Cardanols are commercially available. Particular preference is given to Cardanol NX-2026 (Cardolite), a diunsaturated cardanol of formula (VI) where R═—$C_7H_{14}$—CH═CH—$CH_2$—CH═CH—$C_3H_7$ It is preferable when R in formulae (III) and (IV) is R═—$C_7H_{14}$—CH═CH—$CH_2$—CH═CH—$C_3H_7$.

The composition according to the invention further comprises at least one amine (C) bearing at least two amino groups selected from the group consisting of primary and secondary amino groups. Primary or secondary amino groups are necessary for a Mannich reaction/Betti reaction. By contrast, tertiary amino groups cannot be reacted in a Mannich reaction/Betti reaction.

The composition according to the invention preferably comprises at least one amine (C) bearing at least two primary amino groups.

It is further preferable when the amine (C) Is aromatic. Aromatic amines are amines bearing one or more amino groups each bonded to a carbon atom which is in turn part of an aromatic system. The simplest example of an aromatic amine is aniline (phenylamine, aminobenzene).

It is further preferable when the amine (C) is a dianiline. A dianiline is to be understood as meaning a compound bearing two aminophenyl radicals, in particular two 4-aminophenyl radicals.

According to the invention the amino groups are selected from the group of primary and secondary amino groups. The amine (C) is therefore particularly preferably a dianiline having primary amino groups.

It is further preferable when at least one amine (C) is selected from the group consisting of substituted or unsubstituted 4,4'-isopropylidenedianilines and substituted or unsubstituted 4,4'-methylenedianilines and substituted or unsubstituted 4,4'-sulfonyldianilines, preferably from the group consisting of 4,4'-methylenebis(2,6-diethylaniline), 4,4'-methylenebis(2,8-diisopropylaniline) and 4,4'-diaminodiphenylsulfone. It is particularly preferable when at least one amine (C) is 4,4'-diaminodiphenylsulfone.

Dianilines are commercially available. Thus for example 4,4'-methylenebis(2,6-diethylaniline) is commercially available for example under the name Lonzacure® M-DEA (Lonza), 4,4'-methylenebis(2,6-diisopropylaniline) under the name Lonzacure® M-DIPA (Lonza) and 4,4'-diaminodiphenylsulfone under the name Aradur® 976-1 (Huntsman).

It is preferable when the composition according to the invention additionally comprises at least one (meth)acrylate (D). A (meth)acrylate is to be understood as meaning a compound which bears one or more (meth)acrylate groups, i.e. one or more methacrylic acid ester group(s) and/or acrylic acid ester group(s). The (meth)acrylate (D) serves as a reactive diluent and/or crosslinker. As a reactive diluent the (meth)acrylate (D) may comprise one or more (meth)acrylate groups. As a crosslinker the (meth)acrylate (D) must bear at least two (meth)acrylate groups. If the (meth)acrylate (D) is to be employed both as a reactive diluent and as a crosslinker it is therefore necessary for the (meth)acrylate (D) to comprise at least two (meth)acrylate groups. It is therefore preferable when at least one or all (meth)acrylates (D) bear at least two (meth)acrylate groups. It is further preferable when at least one or all (meth)acrylates (D) bear two to six (meth)acrylate groups. It is preferable when the (meth)acrylate (D) consists only of the elements carbon, hydrogen, oxygen and nitrogen, in particular only of the elements carbon, hydrogen, oxygen. Suitable (meth)acrylates (D) are described in European Coatings Tech Files, Patrick Glöckner et al. “Strahlenhärtung: Beschichtungen und Druckfaben” 2008, Vincentz Network, Hannover, Germany.

It is preferable when at least one (meth)acrylate (D) is selected from the group consisting of trimethylolpropanetriacrylate (TMPTA), tripropyleneglycol diacrylate (TPGDA), dipropylene glycol diacrylate (DPGDA), isobornyl acrylate (IBOA), lauryl acrylate, dodecyl acrylate, 1,6-hexanediol diacrylate (HDDA), tridecyl acrylate, pentaerythritol triacrylate, polyethylene glycol diacrylate and ethoxylated and/or propoxylated derivatives thereof.

It is likewise preferable when at least one (meth)acrylate (D) is selected from the group consisting of the (meth) acrylic acid esters of vanillyl alcohol (4-hydroxy-3-methoxybenzyl alcohol)), guaiacol, creosol such as are described for example by Holmberg. A. L. et al. In “Softwood Lignin-Based Methacrylate Polymers with Turnable Thermal and Viscoelastic Properties” Macromolecules 2016, 49, 1286-1295). Similarly to (meth)acrylated vanillin these compounds are compounds produced from the renewable raw material lignin.

Suitable (meth)acrylates (D) are commercially available under the names Ebecryl® TMPTA (Annex SA, Germany), Ebecryl® OTA480 (a propoxylated glycerol triacrylate, Allnex SA. Germany), Ebecryl® TPGDA (Allnex SA, Germany), Ebecryl® DPGDA (ANnex SA, Germany), Ebecryl® 892 (Allnex SA, Germany), Ebecryl® 11 (a polyethylene glycol diacrylate, Allnex SA, Germany), Ebecryl® 45 (Allnex SA, Germany), PETIA (a mixture of pentaerythritol tri- and tetraacrylate, Allnex SA, Germany), Ebecryl® 150 (a diacrylate based on bisphenol A, Allnex SA, Germany), Ebecryl®605 (a mixture of 80% Bisphenol A diepoxyacrylate and 20% TPGDA, Allnex SA, Germany), Ebecryl® 40 (an ethoxylated and propoxylated pentaerythritol tetraacrylate, Allnex SA, Germany), Laromer® TMPTA (BASF, Germany), Miramer® M200 (HDDA, Rahn AG. Germany), Miramer® M220 (TPGDA, Rahn AG, Germany), Miramer® 3130 (an ethoxylated trimethylolpropane triacrylate, Rahn AG, Germany), SR 415 (an ethoxylated trimethylolpropane triacrylate, Sartomer. France), SR 489 (tridecyl acrylate, Sartomer, France) and Sarbio® 5101 (dodecyl acrylate, Arkema, France).

Suitable (meth)acrylates (D) are likewise commercially available from Evonik Operations GmbH (Germany) under the VISIOMER® product line. Preferred compounds are glycerol formal methacrylate (VISIOMER® GLYFOMA), diurethane dimethacrylate (VISIOMER® HEMA TMDI), butyl diglycol methacrylate (VISIOMER® BDGMA), polyethylene glycol 200 dimethacrylate (VISIOMER® PEG200DMA), trimethylolpropane methacrylate (VISIOMER® TMPTMA), tetrahydrofurfuryl methacrylate (VISIOMER® THFMA), isobornyl methacrylate (VISIOMER® Terra IBOMA), isobornyl acrylate (VISIOMER® IBOA), a methacrylic acid ester of fatty alcohols having on average 13.0 carbon atoms (VISIOMER® Terra C13-MA) or having on average 17.4 carbon atoms (VISIOMER® Terra C17.4-MA).

It is particularly preferable when the composition comprises at least one (meth)acrylate (D) selected from the group of diol- and triol-based di- and trifunctional acrylates, in particular 1,6-hexanediol diacrylate (HDDA).

It is preferable when the composition according to the invention further comprises at least one initiator (E).

The Initiator (E) of the composition according to the invention is a compound which forms radicals when exposed to an external stimulus. This initiator may be actinic radiation, preferably UV light and/or visible light, or heat. Accordingly the initiators (E) may be initiators for photochemical radical curing/polymerization (photoinitiators) and/or initiators for thermal radical curing/polymerization (thermal initiators).

As thermal initiators it is preferable to employ organic peroxides, for example 2,5-bis(tert-butylperoxy)-2,5-dimethylhexane (for example LUPEROX 101®), dilauroyl peroxide (for example LUPEROX LP®), dibenzoyl peroxide (for example LUPEROX A98M) and bis(tert-butyldioxyisopropyl)benzene (for example VuICUP R®) from Arkema (France) or Peroxan BP Pulver 50 W from Pergan GmbH (Germany), a powder containing about 40-50% by weight of dibenzoyl peroxide and about 40-50% by weight of dicyclohexyl phthalate. Preferred thermal initiators further include ketone peroxides such as methylethylketone peroxide, diacyl peroxides such as benzoyl peroxide, hydroperoxides such as cumene hydroperoxide and peroxyketals, dialkyl peroxides, peroxydicarbonates and peroxyesters, and inorganic peroxides such as peroxydisulfates, including sodium persulfate ($Na_2S_2O_8$), potassium persulfate ($K_2S_2O_8$) and ammonium persulfate ($(NH_4)_2S_2O_8$) and also azobisisobutyronitrile (AIBN).

Suitable photoinitiators include all photoinitiators known to those skilled in the art including Norrish type I and Norrish type II photoinitiators. This includes the typically employed UV photoinitiators, such as acetophenones (for example diethoxyacetophenone) and phosphine oxides (for example diphenyl(2,4,6-trimethylbenzoyl)phosphine oxide, phenylbis(2,4,6-trimethylbenzoyl)phosphine oxide (PPO) and bis(2,4,6-trimethylbenzoyl)phenylphosphine oxide). Particularly preferred are Norrish type 1 photoinitiators, such as for example benzophenone, benzoin, α-hydroxyalkylphenone, acylphosphine oxide or derivatives thereof. Suitable photoinitiators are described for example in "A Compilation of Photoinitiators Commercially available for UV today" (K. Dietliker, SITA Technology Ltd., London 2002).

It Is preferable when the composition according to the invention further comprises at least one accelerator (F).

In the case where the composition comprises a thermal initiator it is preferable when an accelerator (F) which accelerates this radical thermal curing is present. Examples thereof include organic acid metal salts, such as cobalt naphthenate, and tertiary aromatic amines, preferably tertiary aromatic amines such as N,N-dimethylaniline, N,N-diethylaniline and N,N-dimethylparatoluidine.

In the case where the composition comprises a photoinitiator it is preferable when an accelerator (F) which accelerates this photochemical radical curing is present. Such an accelerator is also referred to as a photosensitizer. Examples thereof include amines such as n-butylamine, triethylamine, N-methyldiethanolamine, piperidine, N,N-dimethylaniline and triethylenetetramine, sulfur compounds such as S-benzylisothiuronium-p-toluenesulfinate, such as N,N-dimethyl-p-aminobenzonitrile and phosphorus compounds such as sodium diethylthiophosphate.

It Is particularly preferable when the composition according to the invention comprises as accelerator (F) at least one tertiary amine, preferably at least one tertiary aromatic amine, in particular N,N-diethylaniline. N,N-Diethylaniline is commercially available in solution for example under the name PERGAQUICK A3X from Pergan GmbH (Germany). This solution comprises about 5-10% by weight or N,N-diethylaniline and about 80-90% by weight of 1-isopropyl-2,2-dimethyltrimethylene diisobutyrate.

It is preferable when the composition according to the invention further comprises at least one further additive (G). The additive (G) is preferably a substance with which the properties of the uncured or cured composition may be specifically adjusted. These may be for example dyes, pigments, rheology modifiers and impact modifiers but also nanoscale fillers which are employable using infusion and injection processes. Examples thereof include acrylate-functional acrylonitrile-butadiene copolymers such as for example Hypro® VTBNX 1300x43 from Huntsman. Tegomer® M-Si 2850 from Evonik Operations, nanosilica and nanoaluminates.

It is preferable when the composition according to the invention contains or consists of the following constituents in each case based on the total mass of the composition:

one or more aldehydes (A) in a mass fraction of altogether 60% to 90%, preferably 65% to 85%, in particular 70% to 80%;

one or more phenolic compounds (B) in a mass fraction of altogether 1% to 25%, preferably 3% to 20%, in particular 5% to 15%;

one or more amines (C) in a mass fraction of altogether 1% to 20%, preferably of 2% to 10%, in particular of 3% to 5%;

one or more (meth)acrylates (D) in a mass fraction of altogether 1% to 25%, preferably 3% to 20%, in particular 5% to 15%;

one or more initiators (E) in a mass fraction or altogether 0.1% to 5%, preferably of 0.2% to 4%. In particular of 0.3% to 1%;

one or more accelerators (F) In a mass fraction of altogether 0% to 10%, preferably of 0.01% to 5%, in particular of 0.02% to 2%;

one or more additives (G) in a mass fraction of altogether 0% to 10%, preferably of 0.01% to 5%, in particular of 0.02% to 2%.

The compulsory/optional constituents of the composition according to the invention, i.e. aldehydes (A), phenolic compounds (B), amines (C), (meth)acrylates (D), initiators (E), accelerators (F) and additives (G), are all distinct from one another. If a compound can in principle be assigned to two or more or the aforementioned groups (A), (B), (C) (D), (E). (F) and (G), this compound should be assigned to that group among those possible which is named first in the above sequence, unless this rule is explicitly departed from. If a compound, for example, can be assigned to any of groups (B), (D) and (G), it should be assigned to the first of the possible groups, i.e. (B) in this example. A compound is thus not assigned to more than one of groups (A), (B), (C), (D), (E), (F) and (G).

The composition according to the invention may be employed in electronics as a potting compound or in stereolithography (SLA). However, the composition according to the invention is especially suitable for producing fibre-reinforced compositions and, in turn, fibre composite materials produced therefrom.

The invention therefore further provides a fibre-reinforced composition comprising at least one fibre material, preferably composed of one or more renewable raw materials, and the composition according to the invention.

The fibre materials are preferably monofilaments, fibre bundles containing monofilaments, threads containing monofilaments or fibre bundles. The fibre materials are further preferably products such as non-crimp fabrics and woven fabrics containing monofilaments, fibre bundles or threads. Non-crimp fabrics containing fibre bundles are particularly preferred. In the case of woven fabrics these are preferably plain-woven. Preferred non-crimp fabrics are constructed in layers, which may be oriented in the same direction (making for a uniaxial construction) or in different directions (making for a multiaxial construction). The advantage of non-crimp fabrics is that the fibres or fibre bundles of the layers are not bent by the braiding operation. This results in a higher force absorption capacity. The fibre materials are preferably glass fibre, mineral fibre, natural fibre and/or polymer fibre materials, more preferably natural fibre materials, in particular natural fibres. The fibre materials are yet more preferably non-crimp fabrics composed of glass fibre, mineral fibre, natural fibre and/or polymer fibre materials. In particular non-crimp fabrics composed of natural fibres. The fibre materials are preferably manufactured raw products, as cleaned materials or already coated, preference being given to the use of cleaned fibre materials. Cleaning is preferably material-dependent and a preferred cleaning process is a thermal treatment, particularly preferably irradiation using an IR emitter. The thermal treatment may optionally be carried out under protective gas. This cleaning step especially removes the water almost always present in natural fibres which is disruptive in their subsequent use to afford the fibre composite. It is preferable when the fibre material is selected from the group consisting of flax fibres, hemp fibres, jute fibres, kenaf fibres, ramie fibres, sisal fibres and wood fibres. Ultrasound digestion makes it possible to specifically alter the fibres such that standardizable processing operations endow them with reproducible technical properties.

The composition according to the invention and the fibre-reinforced composition according to the invention may be cured using a specific process. The curing of these compositions is effected both via a radical curing mechanism and via a non-radical curing mechanism.

The invention thus yet further provides a process for curing the composition according to the invention or the fibre-reinforced composition according to the invention, characterized in that the curing is effected via a radical and a non-radical curing mechanism and preferably comprises the steps of:

(i) a thermal pre-curing at a temperature of 40° C. to 100° C., in particular over a period of 1 h to 8 h, and/or a photochemical pre-curing via actinic radiation, in particular UV light;

(ii) a thermal post-curing at a temperature of >100° C. to 200° C., In particular over a period of 1 h to 8 h.

Pre-curing is preferably effected via a radical curing mechanism and post-curing via a non-radical curing mechanism.

The radical curing mechanism effects a radical polymerization of the (meth)acrylate groups and optionally ethylenically unsaturated double bonds. The radical polymerization may be thermally or photochemically induced. Thermal pre-curing is employed especially in the production of fibre composite materials and photochemical pre-curing in turn in the field of stereolithography.

Without wishing to be bound to a particular theory it is thought that the non-radical curing mechanism is a generalized Betti reaction which may be regarded as a special case of the Mannich reaction. The Betti reaction is described for example in Cardellicchio et al. "The Betti base: the awakening of a sleeping beauty", Tetrahedron: Asymmetry Volume 21, Issue 5, 30 Mar. 2010, Pages 507-517 (see also https://en.wikipedia.org/wiki/Betti_reaction and https://de.wikipedia.org/wikiBetti-Reaktion). In the present case it is thought that the aldehyde (A), the phenolic compound (B) and the amine (C) react with one another via a Betti reaction. This reaction is shown schematically in FIG. 1.

It is particularly preferable when the thermal post-curing (II) is performed at a temperature of 140° C. to 150° C.

The composition according to the invention is preferably a stable, low-viscosity resin employable with commonly used production processes for fibre composite materials. The process according to the invention is thus preferably an injection process or an infusion process (for example VARI; the vacuum infusion process). These processes are known to those skilled in the art.

Processes according to the invention make it possible to produce thermosets/fibre composite material having exceptional mechanical properties.

The invention thus yet further provides a fibre composite material/thermoset obtainable by the process according to the invention.

The fibre composite materials and thermosets according to the invention are used as components/mouldings (for example as pure resin sheets, as fibre composite components etc.) in aircraft construction, in rail vehicle construction, automaking, shipbuilding, machine construction, plant construction, built structures and in the production of rotor blades for wind power plants.

Even without further elaboration it is assumed that a person skilled in the art will be able to utilize the description above to the greatest possible extent. The preferred embodiments and examples are therefore to be interpreted merely as a descriptive disclosure which is by no means limiting in any way whatsoever.

Figure 2:
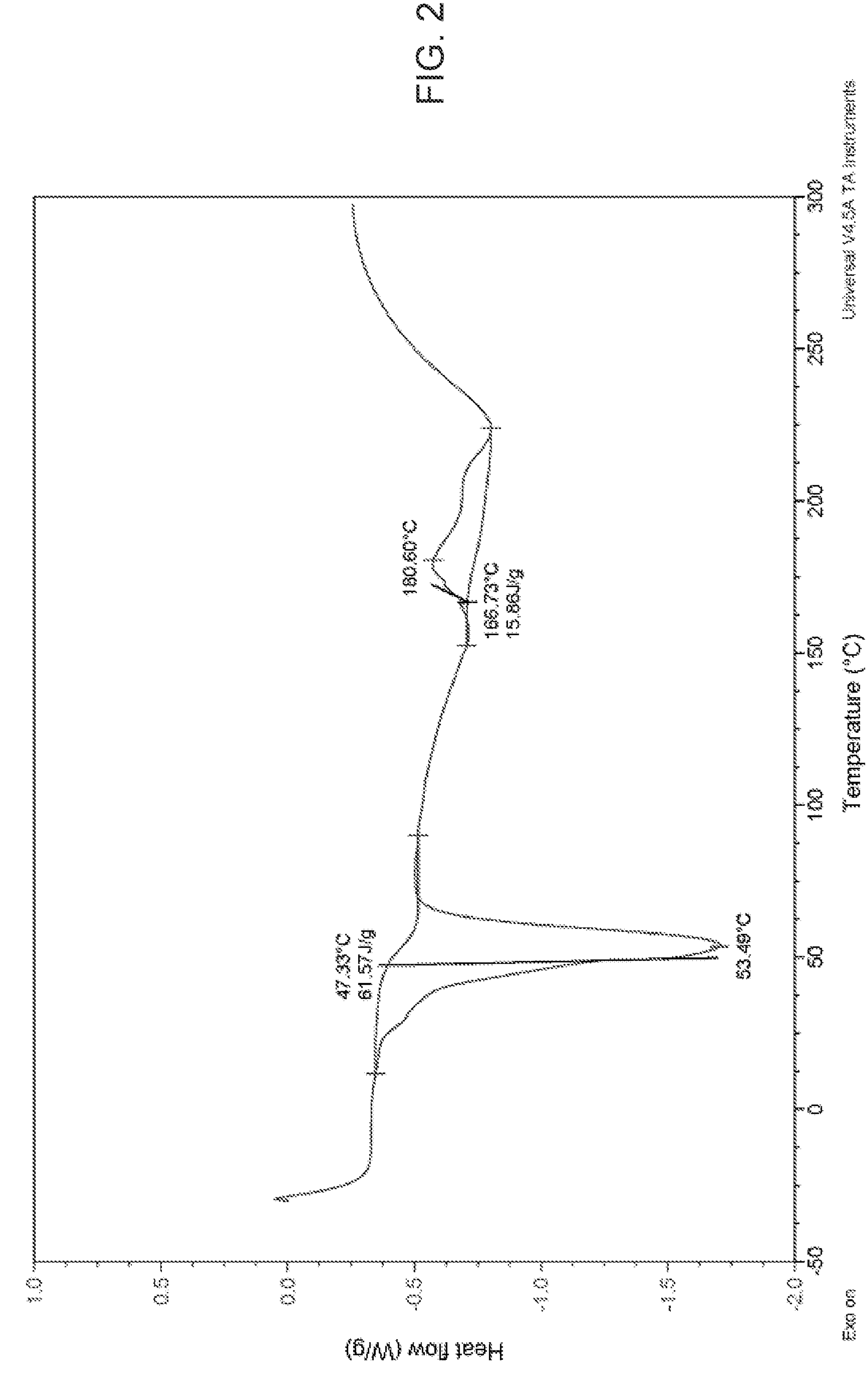
FIG. 2 shows the results of the differential scanning calorimetry (DSC) for the composition according to the invention as described in the examples.

The subject matter of the present Invention will be more particularly elucidated with reference to FIG. 1 and FIG. 2 without any intention that the subject matter of the present invention be confined thereto.

FIG. 1 is a schematic diagram of a condensation reaction (Betti reaction/Mannich reaction) of a phenolic compound (1), an aldehyde (2) and an amine (3) to form a Betti base/Mannich base (4) and to liberate water.

FIG. 2 shows the results of the differential scanning calorimetry (DSC) for the composition according to the invention as described in the examples. Two peaks are apparent, one for the radical pre-curing and one for the non-radical post-curing.

Examples

General Methods:

Glass Transition Temperature (Tg):

Glass transition temperature (Tg) is determined by dynamic mechanical analysis (DMA) according to the standard ISO 8721-11:2019-06.

Elastic Modulus (E):

Elastic modulus (E) is determined by dynamic mechanical analysis (DMA) according to the standard ISO 6721-4:2019-05.

Impact Strength:

Impact strength is determined according to the standard ISO 179-12010-11.

Viscosity:

Viscosity is determined according to the standard DIN EN ISO 3219:1994-10.

Flexural Strength:

Flexural strength is determined via a three point bending test according to the standard ISO 178:2019-04.

Flexural Modulus:

Flexural modulus is determined via a three point bending test according to the standard ISO 178:2019-04.

Differential Scanning Calorimetry (DSC):

Differential scanning calorimetry is performed according to DIN EN ISO 11357-1:2017-02, DIN EN ISO 11357-2:2020-08 and DIN EN ISO 11357-4:2014-10.

Raw Materials:

| Name | Manufacturer | Characterization |
|---|---|---|
| Visiomer ® VALMA | Evonik Operations GmbH | Methacrylated vanillin (vanillin methacrylate) |
| Cardanol NX-2026 | Cardolite | Cardanol (3-pentadeca-dienyl-phenol) |
| HDDA | Allnex | Hexanediol diacrylate |

-continued

| Name | Manufacturer | Characterization |
|---|---|---|
| Aradur ® 976-1 | Huntsman | 4,4'-Diaminodiphenylsulfone |
| PEROXAN BP Pulver 50 W | Pergan GmbH | Powder containing about 40-50% by weight dibenzoyl peroxide about 40-50% by weight dicyclohexyl phthalate |
| PERGAQUICK A3X | Pergan GmbH | Solution containing about 5-10% by weight N,N-diethylaniline about 80-90% by weight 1-isopropyl-2,2-dimethyltrimethylene diisobutyrate |
| Derakane ® Momentum 411-200 | Ineos (formerly Ashland) | Vinyl ester resin based on bisphenol A diglycidyl ether (DGEBA, BADGE) |
| Araldite ® LY 556 | Huntsman | Epoxy resin based on bisphenol A diglycidyl ether (DGEBA, BADGE) |
| Albidur ® HE 600 | Evonik Operations GmbH | Epoxy resin hardener based on hexahydromethylphthalic anhydride (MHHPA) |
| Ancamine ® 2167 | Evonik Operations GmbH | Epoxy resin hardener based on amines |
| ampliTex ® 5008 | Bcomp/Switzerland | Biaxial flax fibre non-crimp fabric |

Resin and Fibre Composite Material:

a) Production or the Resin

In a Speedmixer a mixture of 76 parts by weight of Visiomer® VALMA, 10 parts by weight of Cardanol NX-2026, 10 parts by weight of HDDA and 4 parts by weight of Aradur® 976-1 was initially produced and this mixture subsequently heat-treated at 60° C. for 2 h. A clear liquid product having a viscosity of 260 mPas (measured at 25° C.) was obtained. The product was storage stable. The product was clear even after months of storage and could readily be further used in the infusion process.

b) Curing of the Resin and Mechanical Characteristics 100 parts by weight of the product a) were admixed with 2 parts by weight of Peroxan BP Pulver 50 W and 0.5 parts by weight or Pergaquick AU under inert gas ($N_2$). The pot life (usage time) or this mixture was about 4 h at 60° C. The mixture was pre-cured at 60° C. for 6 h and subsequently post-cured for 2 h at 140° C. The cured product has a glass transition temperature Tg of about 120° C., an elastic modulus of 1.8 GPa and an impact strength of 1.5 kJ/m2. DSC shows two peaks, one for the radical pre-curing and one for the non-radical post-curing.

For comparison: A similarly cured vinyl ester resin typically has a glass transition temperature of about 130° C. and an elastic modulus of about 3 GPa. Vinyl ester resins are also very brittle. A standard epoxy resin such as DGEBA (for example Araldite® LY 558 from Huntsman) cured with an anhydride (for example Albidur® HE 600) has a Tg of 130° C. and an elastic modulus of 2.8 GPa. It must be noted here that the structure of the cured inventive resin is identical neither to that of an epoxy resin nor to that of a vinyl ester resin, especially also because the curing mechanisms differ. Different mechanical properties are thus also to be expected.

c) Production of a Fibre Composite Material and Mechanical Characteristics 100 parts by weight of the product a) were admixed with 2 parts by weight of Peroxan BP Pulver 50 W and 0.5 parts by weight of Pergaquick A3X under inert gas ($N_2$). The obtained mixture is subsequently employed using the vacuum infusion process (VARI). Employed as the fibre material are 4 plies of a biaxial flax fibre non-crimp fabric having a ±45° construction (ampliTex® 5008 from Bcomp/Switzerland) and a basis weight of 350 g/$m^2$. The obtained fibre-reinforced resin is pre-cured at 60° C. under vacuum for 4 h and subsequently post-cured in an oven at 140° C. for 6 h. The mass fraction of renewable raw materials in the thus obtained fibre composite sheet is 93% based on the total mass of the fibre composite material. The fibre composite sheet has a glass transition temperature of about 120° C., a flexural strength of 137 MPa and a flexural modulus of 9.8 GPa.

For comparison: A fibre composite sheet produced with the same textile non-crimp fabric (same production batch) under comparable conditions from standard epoxy resin (LY 558 from Huntsman) with an amine (Ancamine® 2167 from Evonik) and cured for 2 h at 80° C. and 4 h at 150° C. has a Tg or 108° C. a flexural strength of 160 MPa and a flexural modulus of 9.4 GPa. For a jute-reinforced component based on unsaturated polyester resin the literature reports a flexural strength of 80 MPa and a flexural modulus of 4.8 GPa.

Replacement of Vanillin Methacrylate by an Equimolar Mixture of Vanillin and Acrylic Acid Analogously to the process mode described at a) a Speedmixer was initially used to produce a mixture of 52 parts by weight of vanillin, 24 parts by weight of acrylic acid, 10 parts by weight of Cardanol NX-2026, 10 parts by weight of HDDA and 4 parts by weight of Aradur® 976-1 and this composition was subsequently heat-treated at 60° C. for 2 h. The vanillin was only incompletely soluble. A clear solution was thus not obtainable. The obtained composition was, by contrast, a suspension. This composition was in turn not suitable for use in an infusion process since the composition was not able to flow through the fabric without solid constituents of the composition being held back by the fabric. Furthermore, after 4 hours of storage at room temperature a portion of the undissolved vanillin settled at the bottom of the storage vessel.

It was further attempted to cure the obtained mixture according to the process mode described at b). Curing at 60° C. was not observed. At 140° C. severe smoke formation was observed which was apparently attributable to the escaping and possibly decomposing acrylic acid. Finally, a completely unusable, charred and crumbly solid body was obtained.

The invention claimed is:

1. A composition, comprising:

at least one aldehyde (A), at least one phenolic compound (B), and at least one amine (C) bearing at least two amino groups selected from the group consisting of primary amino groups and secondary amino groups, wherein at least one of compounds (A), (B), and (C) bears at least one (meth)acrylate group.

2. The composition according to claim 1, wherein at least one of the compounds (A), (C), and (B) is produced from renewable raw materials or is a renewable raw material.

3. The composition according to claim 1, wherein the at least one aldehyde (A) bears at least one (meth)acrylate group.

4. The composition according to claim 1, wherein the at least one aldehyde (A) is aromatic.

5. The composition according to claim 1, wherein the at least one aldehyde (A) is methacrylated vanillin.

6. The composition according to claim 1, wherein the at least one phenolic compound (B) is an ethylenically unsaturated phenolic compound.

7. The composition according to claim 1, wherein the at least one phenolic compound (B) is a cardanol.

8. The composition according to claim 1, wherein the at least one amine (C) is aromatic.

9. The composition according to claim 1, wherein the composition additionally comprises at least one (meth) acrylate (D).

10. The composition according to claim 1, wherein the composition further comprises at least one initiator (E), and optionally, at least one accelerator (F), and optionally, at least one further additive (G).

11. The composition according to claim 1, wherein the composition contains the following constituents, in each case based on a total mass of the composition:

the at least one aldehyde (A) in a mass fraction of altogether 60% to 90%, the at least one phenolic compound (B) in a mass fraction of altogether 1% to 25%, the at least one amine (C) in a mass fraction of altogether 1% to 20%, one or more (meth)acrylates (D) in a mass fraction of altogether 1% to 25%, one or more initiators (E) in a mass fraction of altogether 0.1% to 5%, one or more accelerators (F) in a mass fraction of altogether 0% to 10%, and one or more additives (G) in a mass fraction of altogether 0% to 10%.

12. A fibre-reinforced composition, comprising:

at least one fibre material, and the composition according to claim 1.

13. A process for curing the composition according to claim 1, the process comprising:

curing the composition via a radical and a non-radical curing mechanism.

14. The process according to claim 13, wherein the process is an injection process or an infusion process.

15. A fibre composite material/thermoset, obtainable by the process according to claim 13.

16. The composition according to claim 8, wherein the at least one amine (C) is a dianiline.

17. The composition according to claim 8, wherein the at least one amine (C) is 4,4'-diaminodiphenylsulfone.

18. The composition according to claim 9, wherein the at least one (meth)acrylate (D) is 1,6-hexanediol diacrylate.

19. The process according to claim 13, wherein the curing comprises:

(i) a thermal pre-curing at a temperature of 40° C. to 100° C., and/or a photochemical pre-curing via actinic radiation; and (ii) a thermal post-curing at a temperature of >100° C. to 200° C.

20. The process according to claim 19, wherein in (i), the thermal pre-curing is over a period of 1 h to 8 h, and/or the photochemical pre-curing is via UV light; and wherein in (ii), the thermal post-curing is over a period of 1 h to 8 h.

* * * * *